United States Patent
Pearce et al.

(10) Patent No.: US 10,170,135 B1
(45) Date of Patent: Jan. 1, 2019

(54) AUDIO GAIT DETECTION AND IDENTIFICATION

(71) Applicant: Intel Corporation, Santa Clara, CA (US)

(72) Inventors: David Pearce, El Dorado Hills, CA (US); Adam Kupryjanow, Gdansk (PL); Gokcen Cilingir, San Jose, CA (US); Suhel Jaber, San Jose, CA (US); Paulo Lopez Meyer, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/858,849

(22) Filed: Dec. 29, 2017

(51) Int. Cl.
*H04R 29/00* (2006.01)
*G10L 25/51* (2013.01)
*G10L 25/03* (2013.01)
*G10L 25/30* (2013.01)
*G06F 17/30* (2006.01)
*H04R 3/00* (2006.01)
*G06N 3/08* (2006.01)
*G06F 3/16* (2006.01)

(52) U.S. Cl.
CPC .......... *G10L 25/51* (2013.01); *G06F 3/165* (2013.01); *G06F 17/30758* (2013.01); *G06N 3/08* (2013.01); *G10L 25/03* (2013.01); *G10L 25/30* (2013.01); *H04R 3/00* (2013.01); *H04R 29/00* (2013.01)

(58) Field of Classification Search
CPC ...................................................... H04R 29/00
See application file for complete search history.

(56) References Cited

U.S. PATENT DOCUMENTS

| | | | | |
|---|---|---|---|---|
| 2016/0263437 A1* | 9/2016 | Kow | .................. | A63B 24/0062 |
| 2016/0350610 A1* | 12/2016 | Yoo | ..................... | G06K 9/00369 |
| 2017/0055880 A1* | 3/2017 | Agrawal | .............. | A61B 5/1038 |
| 2017/0235934 A1* | 8/2017 | Feng | ....................... | G06F 21/32 |
| | | | | 726/19 |
| 2017/0303825 A1* | 10/2017 | Martinson | ............ | A61B 5/0077 |
| 2017/0309142 A1* | 10/2017 | Phillips | .................. | G08B 7/066 |
| 2018/0018509 A1* | 1/2018 | Zhang | ................ | G06K 9/00348 |

(Continued)

OTHER PUBLICATIONS

Castro et al., "Multimodal features fusion for gait, gender and shoes recognition", Machine Vision and Applications, May 6, 2016, pp. 1213-1228.

(Continued)

*Primary Examiner* — Olisa Anwah
(74) *Attorney, Agent, or Firm* — Jordan IP Law, LLC

(57) ABSTRACT

Systems, apparatuses and methods for technology to perform gait detection and identification. The system includes a pre-processing pipeline to process audio input data from one or more microphones to combine and strengthen an audio gait signal. The pre-processing pipeline is coupled to a gait detector to detect the sound of one or more footsteps from the audio gait signal. The system also includes a person evaluator (e.g., identifier/verifier) to identify the person associated with the one or more footsteps using a set of trained footstep identification (ID) classifiers. Each trained footstep ID classifier is mapped to the gait of a specific person in the home based on a particular combination of person, footwear, and floor surface within the home.

25 Claims, 9 Drawing Sheets

(56) References Cited

U.S. PATENT DOCUMENTS

2018/0082304 A1* 3/2018 Summerlin ...... G06Q 20/40145

OTHER PUBLICATIONS

Geiger et al., "Acoustic Gait-Based Person Identification Using Hidden Markov Models", Proceedings of the Jun. 11, 2014 Workshop on Mapping Personality Traits Challenge and Workshop, 2014, pp. 25-30.
Geiger et al., "Gait-Based Person Identification by Spectral, Cepstral and Energy-Related Audio Features", 2013 IEEE International Conference on Acoustics, Speech and Signal Processing, 2013, pp. 458-462.

* cited by examiner

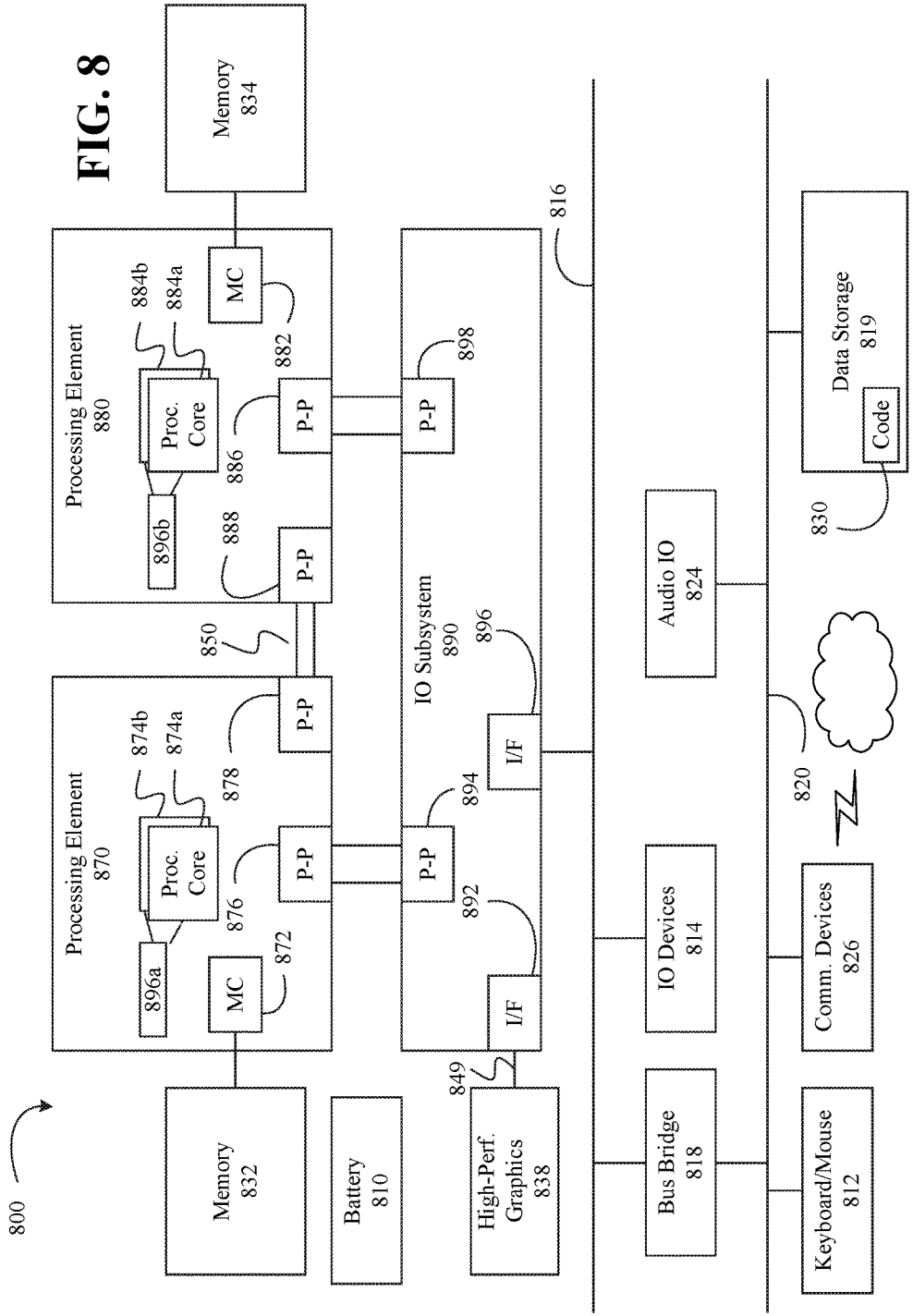

AUDIO GAIT DETECTION AND IDENTIFICATION

TECHNICAL FIELD

Embodiments generally relate to audio gait detection and training. More particularly, embodiments relate to automatic gait detection to determine the identity and location of a person in a smart home environment.

BACKGROUND

Smart home systems may use cameras and video analysis, such as person recognition based on their facial features, to determine the identity and location of a person in the home. Having surveillance cameras throughout the home, however, may be regarded by many users as an invasion of privacy that also incurs additional costs associated with purchasing and installing cameras in every room. Alternatively, each person could wear a device, such as, for example, a radio frequency (RF) identification (ID) tag that communicates with associated sensors located in every room to determine where each person is located. This approach, however, may call for each person to always wear an identification tag, which may not be user friendly.

BRIEF DESCRIPTION OF THE DRAWINGS

The various advantages of the embodiments will become apparent to one skilled in the art by reading the following specification and appended claims, and by referencing the following drawings, in which:

FIG. 8 is a block diagram of an exemplary computing system according to an embodiment.

Figure 1:
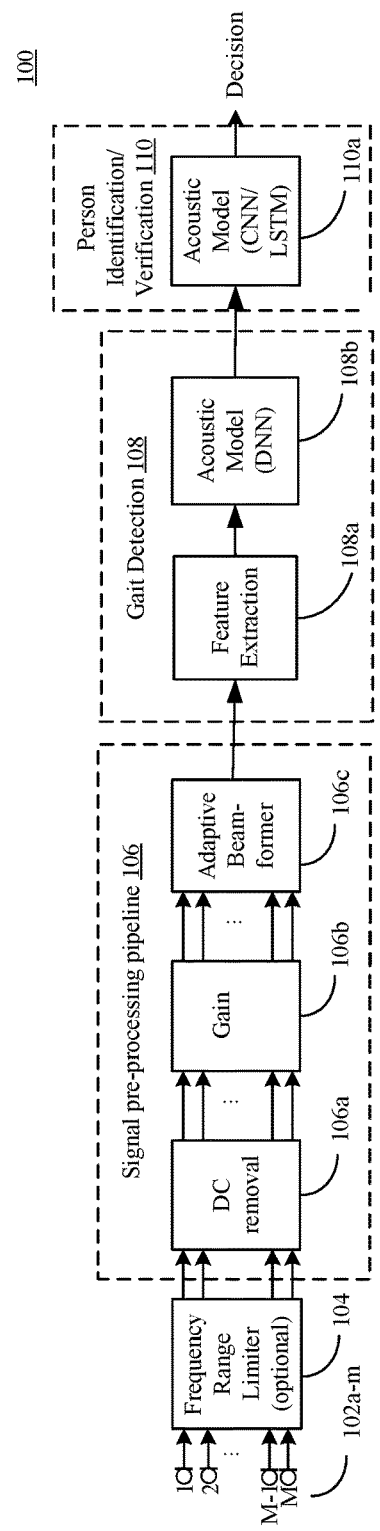
FIG. 1 is a block diagram of an example of an audio processing pipeline system to identify/verify a person based on audio gait detection according to an embodiment.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

DESCRIPTION OF EMBODIMENTS

Technology to perform audio gait detection in the home is described herein. A system may perform automatic audio gait detection to determine the location of a person in a smart home environment. In smart home systems where there are multiple smart speaker devices located in different rooms of the home, a useful feature is to know which loudspeaker is closest to each person. This information may, for example, be used by a voice assistant system that has proactive information delivery services to deliver a message only to the loudspeaker that is closest to the person whom the message is intended for, rather than all the loudspeakers in the house.

Embodiments described herein may use automatic gait detection to detect footsteps and identify the person and their location within the home. A message may be delivered to the person that the message is intended for based on information about their location in the home that is derived from the samples of their gait ID. The message is delivered to the closest loudspeaker to that person and not to the other loudspeakers in the home.

Embodiments described herein may also use gait detection and identification to predict device usage potential for the devices in the home. Devices with low usage potential may be deactivated to save power. Devices with high usage potential may be proactively activated to reduce latency due to costly device activation times. The presence or absence of a person located near a device affects the usage potential of the device.

Although embodiments are directed to the home environment, embodiments are not limited to just the home environment. In fact, embodiments may include other types of dwellings, such as, for example, an office environment. Embodiments are also directed to gait detection for person identification. Although gait detection is used for person identification, other embodiments may combine gait identification with information obtained from other available sensors in the home.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 is a block diagram of an example of an audio processing pipeline system 100 to identify and/or verify a person based on audio gait detection according to an embodiment. The illustrated audio processing pipeline system 100 may include a plurality of microphone devices 102a-m, an optional frequency range limiter 104, a signal pre-processing pipeline 106, a gait detection module 108, and a person identification/verification module 110. In one embodiment, the plurality of microphone devices 102a-m may be coupled to the frequency range limiter 104 and the frequency range limiter 104 may be coupled to the signal pre-processing pipeline 106. In another embodiment, the plurality of microphone devices 102a-m may be coupled to the signal preprocessing pipeline 106 (when the frequency range limiter 104 is not included). The signal preprocessing pipeline 106 may be coupled to the gait detection module 108 and the gait detection module 108 may be coupled to the person identification/verification module 110.

In one embodiment, the plurality of microphones 102a-m may be one or more microphone arrays used to receive audio within the home. The plurality of microphones may be dispersed within the home, such as, for example, one microphone array per room in the home. In another embodiment, the plurality of microphones 102a-m may be part of a voice command device such as, for example, Amazon Echo with Alexa Voice. Amazon Echo is a smart speaker developed by Amazon.com that comprises a speaker with a seven piece microphone array. The device connects to a voice controlled intelligent personal assistant named Alexa. In this instance, Echo speakers may be placed throughout the home. Other companies, such as, for example, Google and Apple, are developing similar voice command devices that may be utilized as well.

If there are frequencies that need to be omitted, the frequency range limiter 104 may be used to band limit the incoming frequencies. For example, if speech is to be omitted, the frequency range limiter may only allow frequencies outside of the speech range of ~100 Hz-8 kHz to be passed to the signal preprocessing pipeline. If there are no frequencies that need to be omitted, the frequency range limiter 104 may be bypassed or omitted to allow all frequencies to pass to the signal pre-processing pipeline 106.

The signal pre-processing pipeline 106 processes each microphone signal separately and outputs a single audio stream in the direction from which the sound of the gait is coming into the device. The signal pre-processing pipeline 106 comprises a DC removal block 106a, a gain block 106b, and an adaptive beamformer block 106c. The DC removal block 106a may be coupled to the gain block 106b and the gain block 106b may be coupled to the adaptive beamformer block 106c.

The DC removal block 106a may be used to eliminate a non-zero DC bias level in each audio signal received from the microphones 102a-m that may degrade system performance and/or increase bit error rates. The gain block 106b, after receiving the signals from the DC removal block 106a, may be used to boost the level of the signal for each microphone 102a-m. The adaptive beamformer 106c, after receiving the signals from the gain block 106b, may combine the signals in a manner that increases the signal strength to/from a chosen direction while attenuating all other signals to/from the undesired directions. In this instance, the adaptive beamformer 106c may combine the signals representing the gait and attenuate all other remaining signals. For example, the sounds in a room from one's footsteps may be strengthened while all other sounds from within the room are attenuated.

The illustrated gate detection module 108 comprises a feature extraction module 108a and an acoustic model 108b. The feature extraction module 108a may receive as input the output signal from the adaptive beamformer 106c and extract audio features from the output signal that are dedicated to the gait signal. Audio features, such as, for example, audio features based on log filter bank, are highly optimized for improving the accuracy of event detection. For example, features that may be indicative of energy are the first impact of a heel from a shoe touching a surface of a floor and the toe of a shoe leaving the surface of a floor. The extracted features are then fed into the acoustic model 108b. The acoustic model 108b may be, for example, an acoustic gait-based detector (e.g., implementing an acoustic gait-based detection algorithm and/or process), such as, for example, a machine learning algorithm and/or process to determine whether footsteps are detected. In one embodiment, the machine learning algorithm may be, for example, a Deep Neural Network (DNN), a Maximum Likelihood Recognizer, a Support Vector Machine, a Convolutional Neural Network, a Recurrent Neural Network, or another machine learning algorithm. When the acoustic model 108b detects footsteps (i.e., gait data), the footsteps are sent to the person identification/verification module 110 (e.g., person evaluator).

The person identification/verification module 110 comprises an acoustic model 110a that utilizes machine learning algorithms for identifying/verifying the person associated with the footstep or gait. In one embodiment, Convolutional Neural Networks (CNNs) with Long Short-Term Memory (LSTM) networks may be used to identify the person associated with the footstep or gait. Usage of LSTMs improves person identification/verification accuracy because it not only analyzes the current signal frame, but also takes into account the relationship between the neighboring frames for an acoustic model created for a particular person. In other embodiments, other types of machine learning algorithms may be used, such as, for example, a Deep Neural Network (DNN), a Maximum Likelihood Recognizer, a Support Vector Machine, a Recurrent Neural Network, or another machine learning algorithm.

To get good performance from a system, such as the system shown in FIG. 1, classifiers that have been trained for all combinations of personal profiles, footwear, and floor surfaces may be used. Footwear and floor surfaces change over time as a person changes their choice of footwear and as floor surfaces become worn or are replaced. One particular challenge in a home environment is how to simply and easily enroll each combination of footwear and floor surface for each person in the home. Users may not want to spend time on an explicit enrollment process for each combination of footwear and floor surface. Embodiments may therefore provide a method of automatically enrolling new gait sounds into a gait classification system each time an unknown gait sound is detected.

Figure 2A:
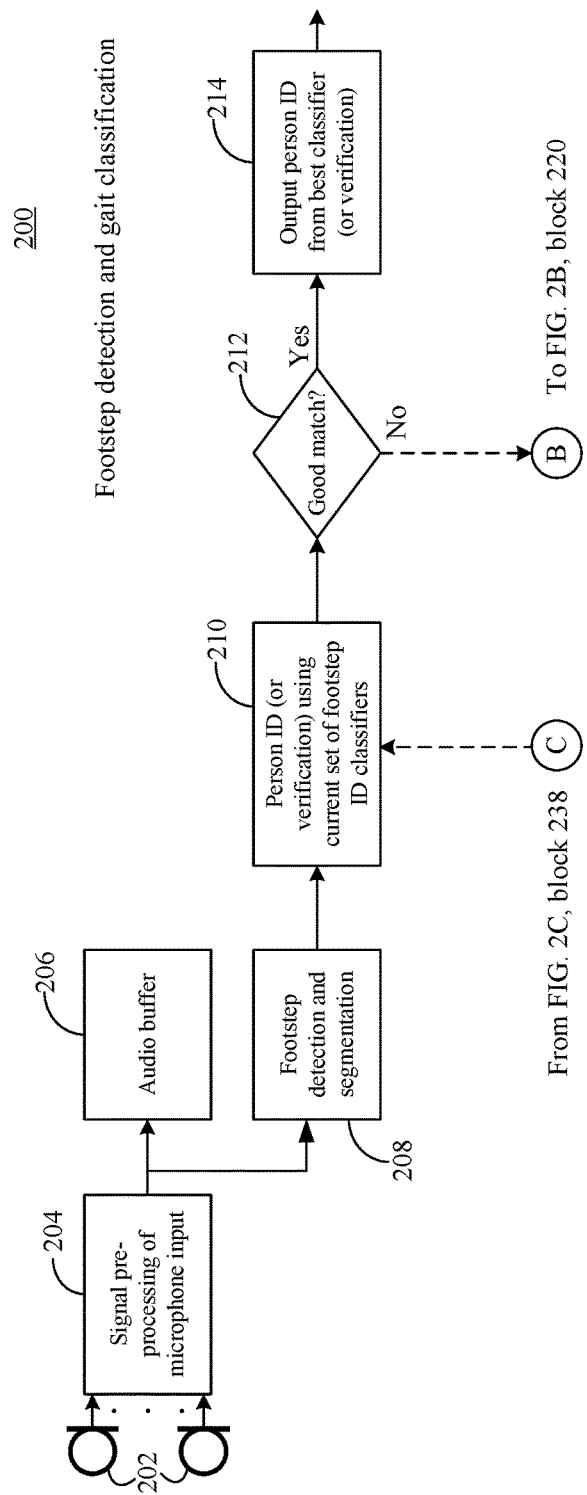
FIGS. 2A, 2B, and 2C are a flow diagrams of an example of a method of gait identification, classification, and enrollment according to an embodiment.
Figure 2B:
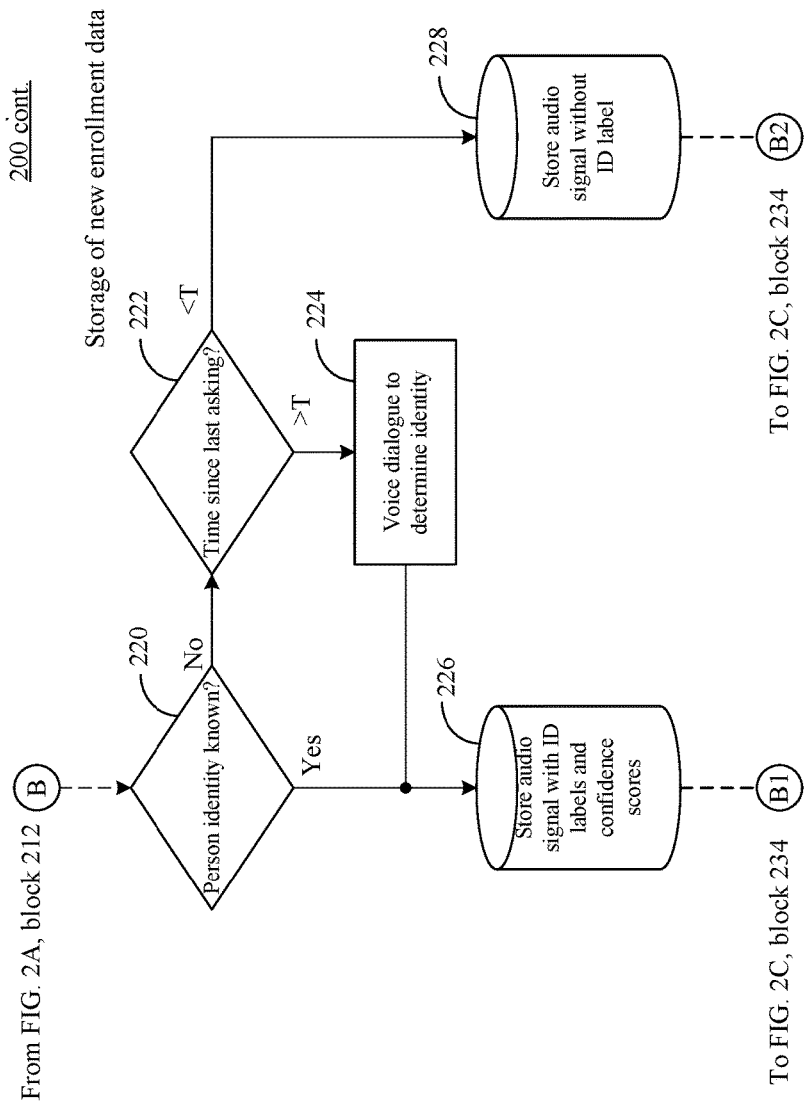
Figure 2C:
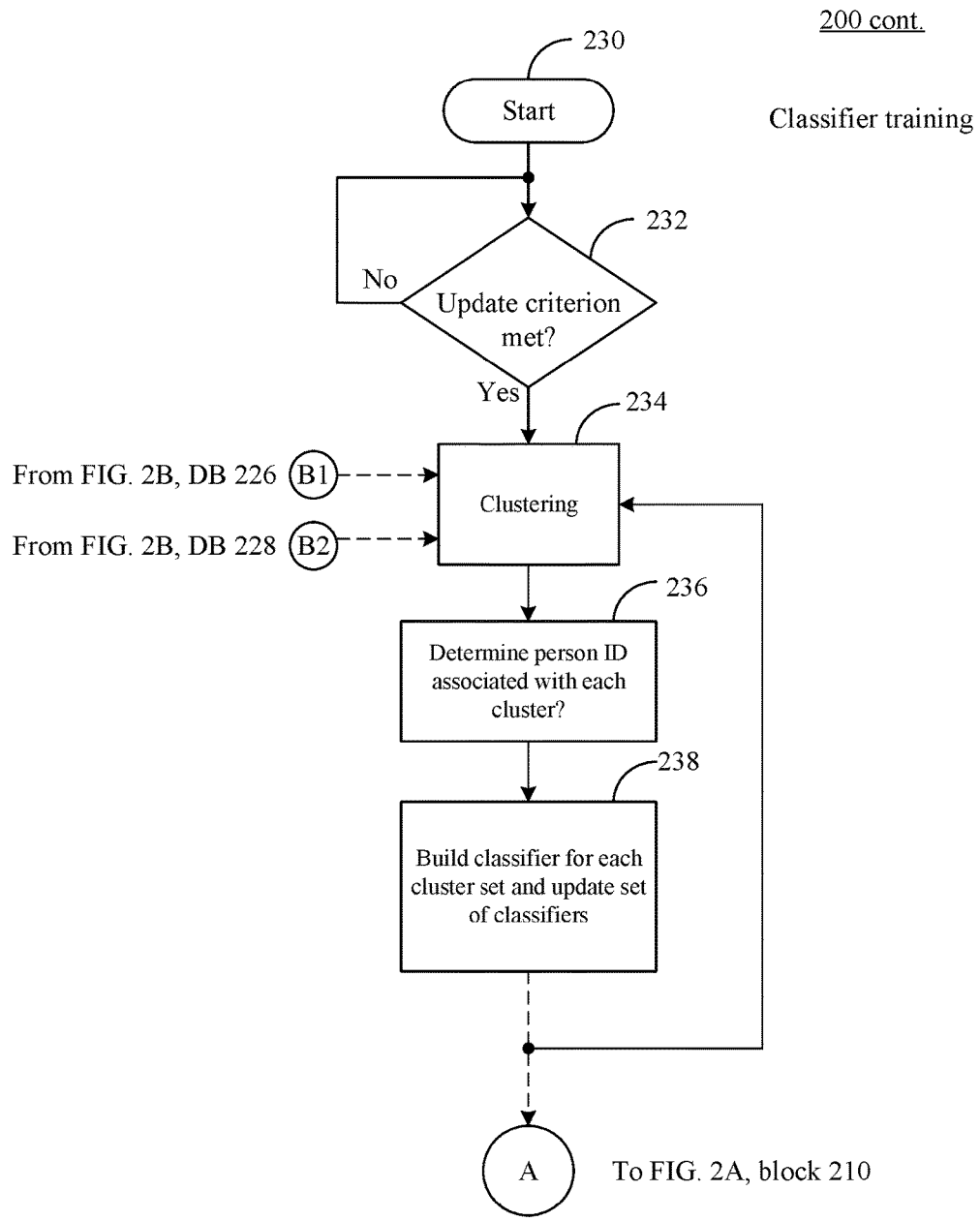

FIGS. 2A, 2B, and 2C are a flow diagrams of an example of a method 200 of gait identification, classification, and enrollment according to an embodiment. The method 200 may generally be implemented in a system such as, for example, the audio processing pipeline system 100 as shown in FIG. 1. More particularly, the method 200 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 200 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural component that are native to hardware (e.g., host processor, central processing unit (CPU), microcontroller, etc.)

The flow diagram 200 is divided into three main sub-flow diagrams. The first sub-flow diagram, shown in FIG. 2A, illustrates footstep detection and gait classification. The second sub-flow diagram, shown in FIG. 2B, illustrates storage of new enrollment data. The third sub-flow diagram, shown in FIG. 2C, illustrates classifier training/retraining and updates.

In FIG. 2A, the process begins in block 202 where audio input is received from one or more microphones. The process then proceeds to block 204.

In block 204, the audio input received from the one or more microphones is pre-processed to reduce noise (as described in the signal preprocessing pipeline 106 in FIG. 1). The pre-processed/output signal is stored in an audio buffer in block 206. The process then proceeds to block 208.

In block 208, a footstep detection algorithm executes in parallel to the audio buffer. The footstep detection algorithm detects the sound of any footsteps that are heard. The algorithm may be implemented using many different technologies that are known to someone skilled in the relevant art(s). For example, the first stage of the footstep detection algorithm includes feature extraction (as previously described FIG. 1). Feature extraction may be, for example, a frame based spectrum analysis or mel-cepstrum produced every 10 msecs. The second stage of the footstep detection algorithm includes some type of machine learning algorithm, such as, for example, Maximum Likelihood Recognizer, Support Vector Machine, Deep Neural Network, Convolutional Neural Network, Recurrent Neural Network, or another type of machine learning algorithm). Often times, such a detector will be trained on a large database covering a large and representative set of examples of footsteps covering many different people, footwear, and floor surfaces. The purpose of the detector is to be able to detect footsteps originating from any person wearing any type of footwear on any household surface with the best performance possible, while also rejecting other sound. The footstep detection algorithm also contains a segmentation algorithm that segments the audio in the audio buffer to select the segments that correspond to the footsteps and are of sufficient loudness and quality, (e.g., signal-to-noise ratio/SNR that exceeds a particular threshold). Note that the duration of the input audio labeled as footsteps by the segmentation algorithm may be different from that used by the detection algorithm. For example, the footsteps may continue for longer than when the footsteps are first detected by the detection algorithm and therefore the segmentation algorithm can select a correspondingly longer duration of input audio. After footsteps have been detected by the detection algorithm, the process then proceeds to block 210.

In block 210, the audio footstep data is received from block 208 for person identification using a set of footstep ID classifiers. Each one of the set of footstep ID classifiers (or set of outputs from one large neural network) are each mapped to a specific person in the household. At any time, the current active set of footstep ID classifiers correspond to the latest set of trained classifiers that have been prepared by the classifier training sub-flow, described below (see FIG. 2C). The number of active classifiers will increase over time as more training/enrollment data is collected, stored (storage sub-flow described below, see FIG. 2B), and periodically updated by the classifier training sub-flow, described below (see FIG. 2C). After sufficient training samples have been collected from a particular person, there may be multiple classifiers corresponding to the sounds from that person's footsteps. For instance, there may be separate classifiers corresponding to each combination of footwear and floor type for each person's gait.

Person identification is performed with the current set of footstep ID classifiers in block 210 and a score (or probability of likelihood) is produced. The audio footstep data received from block 208 is compared with the current set of footstep ID classifiers to obtain the score (or the likelihood of success). Alternatively, block 210 may perform person verification to verify that a user is the person whom they claim to be. The process then proceeds to decision block 212.

In decision block 212, it is determined whether any footstep ID classifiers were a good match. A good match will occur when the particular combination of personal profile, footwear, and floor type have been heard previously and is enrolled in the system (see storage and classifier training sub-flows in FIGS. 2A and 2B). If a good match was found, the process proceeds to block 214.

In block 214, the gait identification (ID) (or verification) of the person identified from the best matched footstep ID classifier is output from the system to be utilized for a particular use application.

Returning to decision block 212, if it is determined that the audio footstep data is a poor match with the current set of footstep ID classifiers, then the sound of the person, footwear, and floor type has not been heard before or has not been heard enough times before to be recognized. Therefore, the segmented sample audio in the audio buffer in block 206 may be added to the training database as part of the automatic enrollment process. The process then proceeds to decision block 220 in the second sub-flow for the storage of new enrollment data in FIG. 2B.

FIG. 2B shows the second sub-flow for storage of new enrollment data. New enrollment data can be stored with or without a label of the person's ID. The identity can be obtained by one of two methods: (1) a person's biometric, such as, for example, voice ID or face ID; or (2) entering into a voice dialogue with the person to determine their identity. A voice dialogue may include the system making an inquiry as to who an individual is, such as, "Hi, is this Helen?" Then the person may respond saying, "No, it's not Helen, it's Brian." The system may then label the recent footstep recording with the ID "Brian". This is a simple example of a voice dialogue act by way of illustration. The system is not limited by this voice dialogue, and in fact, many other possible dialogue's may be used to obtain ID information.

The storage process begins with decision block 220. In decision block 220, it is determined whether the person's identity is known. If the person's identity is known, the audio signal is stored in storage 226 with an ID label and confidence score. If the person's identity is unknown, the process proceeds to decision block 222.

To avoid becoming an annoyance to users to repeatedly get system dialogue's asking who they are, the system checks to make sure the user has not been asked too soon since the last query. In decision block 222, the time since the last inquiry is determined. If the time since the last inquiry is less than a predetermined time T, the audio signal of the detected footsteps is stored without an identification label in storage 228. If the time since the last inquiry is greater than a predetermined time T, the process proceeds to block 224.

In block 224, a voice dialog is given to determine the identity of the detected footsteps. Once the identity is determined, the audio signal of the detected footsteps is stored in storage 226 with an ID label and confidence score.

Over time, a backlog of new stored training/enrollment samples (new detected footsteps stored in storages 226 and 228) are built up. Classifier training is described in the third sub-flow illustrated in FIG. 2C.

In FIG. 2C, classifier training begins in block 230 and immediately proceeds to decision block 232. In order to begin classifier training, a criterion must be met. The criterion requires that the number of new training samples exceed a pre-determined threshold or that a certain period of time has elapsed. In decision block 232, it is determined whether the criterion has been met. If the criterion has not been met, the process remains at decision block 232 until the criterion has been met. If the criterion has been met, the process proceeds to block 234.

In block 234, clustering is performed on the complete set of training samples. The complete set of training samples includes both the current set of classifier data and the new enrollment data collected in FIG. 2B (from databases 226 and 228). Various types of clustering algorithms may be used. There will be some form of distance metric (or similarity metric) that provides a measure of the separation (or closeness) between individual recordings and a clustering algorithm, such as, for example, k-means and DenStream, to iteratively learn the number and centroids of a set of clusters. The process then proceeds to block 236.

In block 236, a person ID associated with each cluster is determined. Each training sample is assigned to a cluster. Some of the samples in each cluster will have an associated ID label and confidence score. An overall ID label (or multiple ID labels and probabilities) for each cluster is determined by combining the information from the set of points that do have a label, such as, by majority vote. This label is applied to all of the files associated with that particular cluster. The process then proceeds to block 238.

In block 238, a classifier for each cluster set is built and the set of classifiers are updated. A new set of classifiers, one or more for each cluster, are trained on the labeled sample. The new set of trained classifiers corresponds to the classifier sets used in block 210 to determine the identity of a person's gait. As described previously, the type of classifier training that is used includes anyone of the following machine learning algorithms, such as, Maximum Likelihood Recognizer, Support Vector Machine, Deep Neural Network, Convolutional Neural Network, Long Short-Term Memory (LSTM) networks, Recurrent Neural Network, etc. The set of classifiers used by block 210 are updated with the new set. With each training, the new set of classifiers will include more training samples that were not previously covered by the previous set of classifiers and hence new conditions get successfully enrolled into the updated set.

As previously indicated in block 214, the ID (or verification) of the person identified from the best matched footstep ID classifier is output from the system to be utilized for a particular use application. In an embodiment where there are multiple loudspeaker devices capable of voice assistant services located in different rooms of the home, audio gait detection may enable the delivery of a message through the loudspeaker that is closest to the person whom it is intended for without broadcasting the message to the remaining loudspeakers within the home.

Figure 3:
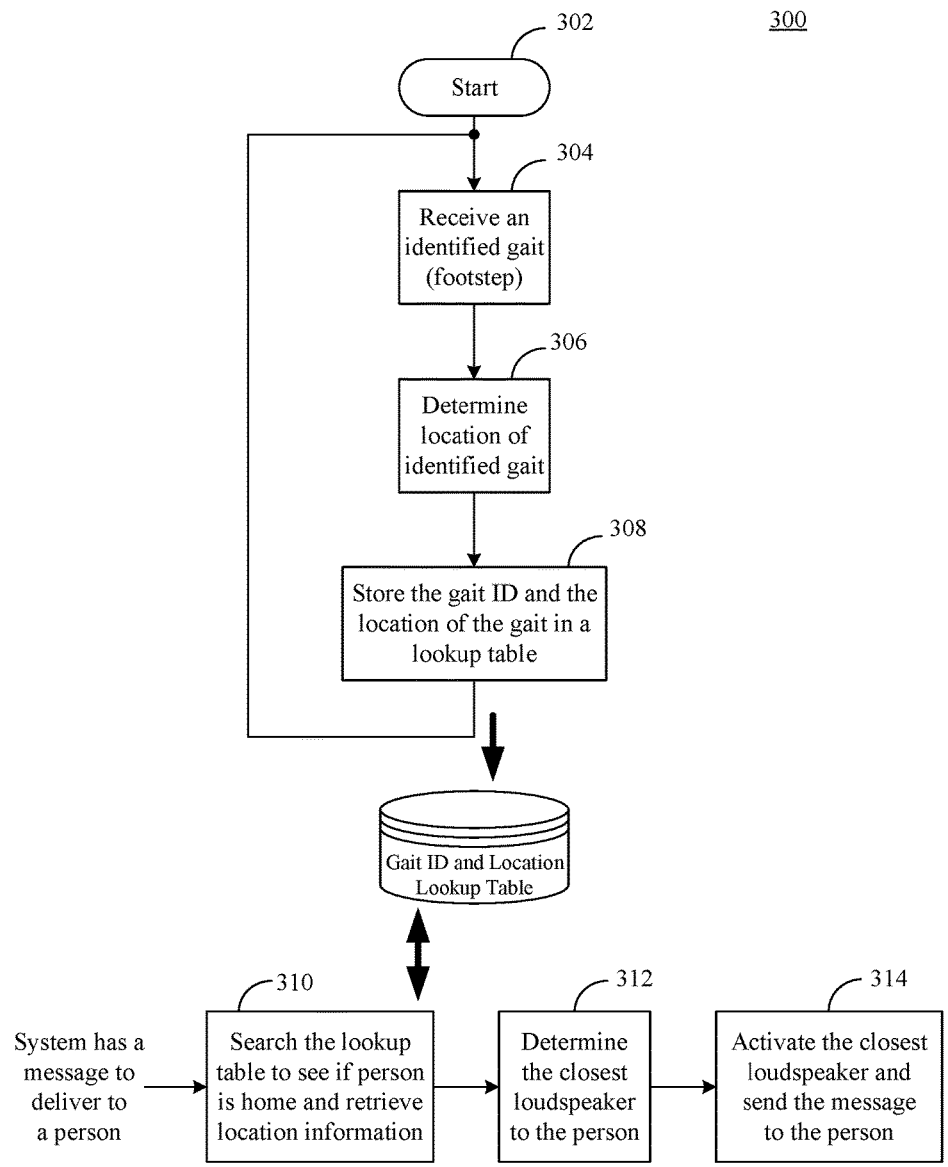
FIG. 3 is a flow diagram of an example of a method of determining the closest loudspeaker to a person based on audio gait detection according to an embodiment.

FIG. 3 is a flow diagram of an example of a method 300 of determining the closest loudspeaker to a person based on audio gait detection according to an embodiment. The method 300 may generally be implemented in a system such as, for example, the audio processing pipeline system 100 as shown in FIG. 1. More particularly, the method 300 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The process begins in block 302, where the process proceeds to block 304.

In block 304, the system, operating in always listening mode, receives an identified gait or footstep (output from block 214 in FIG. 2). The process then proceeds to block 306.

In block 306, the location of the identified gait or footstep is determined. The process then proceeds to block 308.

In block 308, the gait ID and the location of the gait are stored in a lookup table with a timestamp. Processes 304-308 operate continuously in always listening mode.

When the system receives a message to deliver to a specific person in the home, the system searches the lookup table to see if the person is at home based on the timestamp in block 310. The process then proceeds to block 312.

In block 312, if the person is identified as being home, the closest loudspeaker to the person is determined. When the home system is configured, the location of all loudspeakers in the home system are stored. The closest loudspeaker to the person is determined by comparing the person's location to the locations of all of the loudspeakers in the home. The loudspeaker with the shortest separation distance from the person may be chosen. If the loudspeaker chosen is not located in the same room as the person, the loudspeaker located in the same room as the person may also be chosen. The process then proceeds to block 314.

In block 314, the closest loudspeaker(s) to the person is activated to deliver the message while all other loudspeakers are silenced. The process from block 310-314 is repeated each time a new message is received.

In addition to determining the nearest loudspeaker identification, another usage of the gait detection system allows ambient compute and display devices in the home to be turned on and off based on device usage potential. In an embodiment where there are multiple ambient compute and display devices within the home, including speech assistants, that are always listening, device usage potential is predicted based on gait detection and identification to save power and to reduce latency. The system may deliver power savings by turning devices off or by forcing unused or unlikely to be used devices into a deep sleep state. The system may reduce latency due to costly device activation times by proactively waking devices from a deep sleep state. The presence or absence of a person to nearby compute and display devices may affect the usage potential. For example, usage potential of ambient compute and display devices in a room may be low unless the presence of a person is detected in the room using gait detection.

Figure 4:
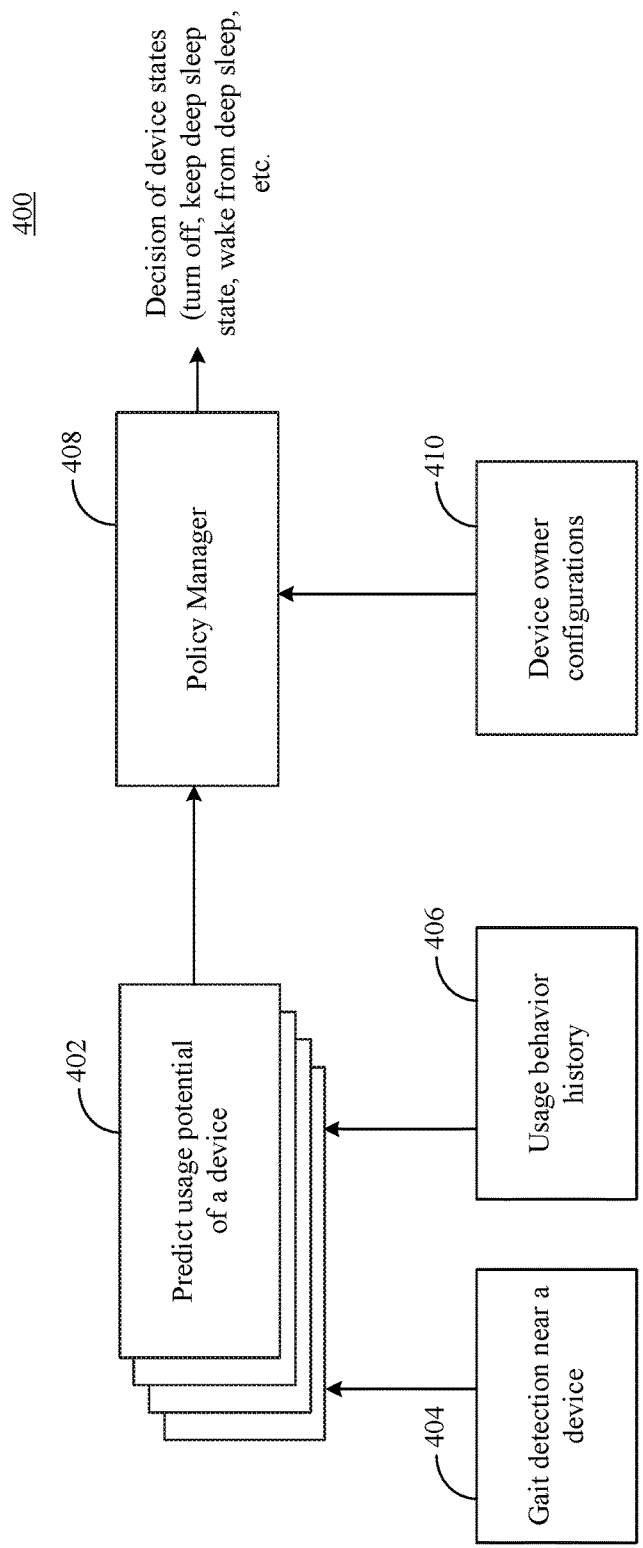
FIG. 4 is a flow diagram of an example of a method of predicting usage potential of devices based on audio gait detection according to an embodiment.

FIG. 4 is a flow diagram of an example of a method 400 of predicting usage potential of devices based on audio gait detection according to an embodiment. The method 400 may generally be implemented in a system such as, for example, the audio processing pipeline system 100 as shown in FIG. 1. More particularly, the method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

A predict usage potential block 402 (e.g., usage predictor implemented in logic instructions, configurable logic, fixed-functionality logic hardware, etc., or any combination thereof) may provide a prediction based on inputs for each ambient compute and display device in the home to a policy manager 408 and, in turn, the policy manager determines each device state, such as, for example, turn on, turn off, keep in deep sleep state, wake from deep sleep state, etc. Gait detection near a device 404 outputs a proximity score to the device. In one embodiment, tracking a gait in progress and predicting where that person is headed may be used to calculate the proximity score. When a person's gait is detected near a device, the predict usage potential block 402 receives the gait ID for that device and the proximity score indicating how close the person is located to the device. The higher the proximity score, the closer the person is to the device.

User behavior history can affect the usage potential of a device. As shown, usage behavior history 406 is another input to the predict usage potential block 402. Usage behavior history 406 is the usage behavior data for a device that is learned over time. For example, a policy manager can learn that a smart display in the bedroom is generally activated around 9 PM, but not activated in the morning. This type of usage history can be taken into account to determine device usage potential. User behavior history can be used to proactively activate certain devices even if a person is not in the room yet to reduce latency due to long device activation times. For example, if it is known that when Mary wakes up, she enters the kitchen and uses the speech assistant to check on the weather/news, etc., then the speech assistant device's use potential increases depending on time of day and gait detection in one of the bedrooms.

Device usage times are stored in a database and in regular intervals this data is traversed to come up with summary tables with entries such as, for example, <user, day, time of day, usage probability>. The predict usage potential block 402 processes the summary tables and provides a final score for each device usage probability. The device usage probability data is provided to the policy manager 408. The policy manager 408 considers the device usage probability data to determine the state of the device. Note that device owner rules 410 are taken into consideration by the policy manager when determining the state of the device. If some devices are configured to only be operable by a certain person, their usage potential will change depending on the presence of that person detected via gait identification near that device. For example, a device owner rule may be that only user A is authorized to use a particular device. When user A enters a room in which the particular device is located, usage potential of that particular device increases.

The policy manager 408 may be programmed to use predicted usage potential of devices and a number of thresholds to decide when to activate and when to deactivate a device. In addition, the policy manager 408 may be programmed to adjust these thresholds in the deployed home according to usage potential predictions made on the actual usage history of devices.

Figure 5:
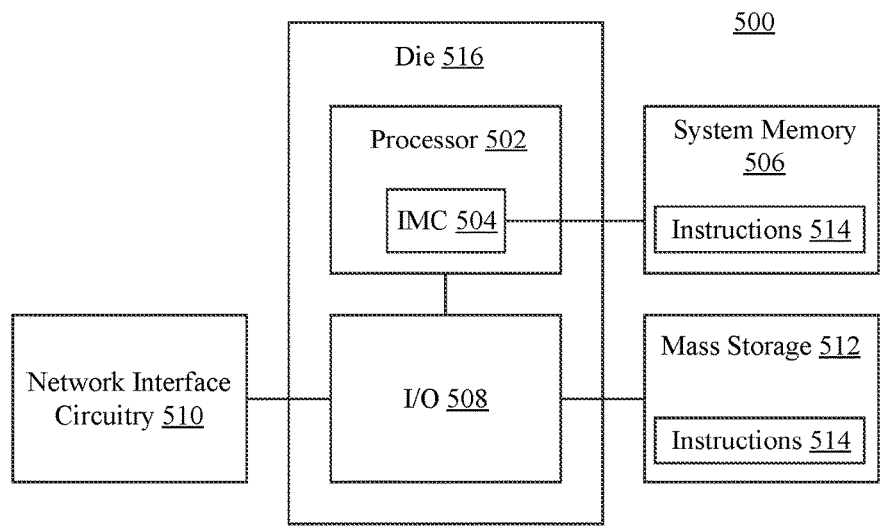
FIG. 5 is a block diagram of an example of an audio gait detection and identification/verification system according to an embodiment.

FIG. 5 shows a system 500 that may be readily substituted for the audio processing pipeline 100 system shown above with reference to FIG. 1. The illustrated system 500 includes a processor 502 (e.g., host processor, central processing unit/CPU) having an integrated memory controller (IMC) 504 coupled to a system memory 506 (e.g., volatile memory, dynamic random access memory/DRAM). The processor 502 may also be coupled to an input/output (I/O) module 508 that communicates with network interface circuitry 510 (e.g., network controller, network interface card/NIC) and mass storage 512 (non-volatile memory/NVM, hard disk drive/HDD, optical disk, solid state disk/SSD, flash memory).

The network interface circuitry 510 may receive audio data from a plurality of microphones such as, for example, microphones 102a-m (shown in FIG. 1), wherein the system memory 506 and/or the mass storage 512 may be memory devices that store instructions 514, which when executed by the processor 502, cause the system 500 to perform one or more aspects of the method 200 (FIGS. 2A, 2B, and 2C), the method 300 (FIG. 3), and/or the method 400 (FIG. 4), already discussed. Thus, execution of the instructions 514 may cause the system 500 to pre-process audio input data to combine and strengthen an audio gait signal; detect the sound of one or more footsteps from the audio gait signal; and identify the person associated with the one or more footsteps using a set of trained footstep identification (ID) classifiers, wherein each trained footstep ID classifier is mapped to the gait of a specific person in the home based on a particular combination of personal profile, footwear, and/or floor surface within the home. The processor 502 and the IO module 508 may be incorporated into a shared die 516 as a system on chip (SoC).

Figure 6:
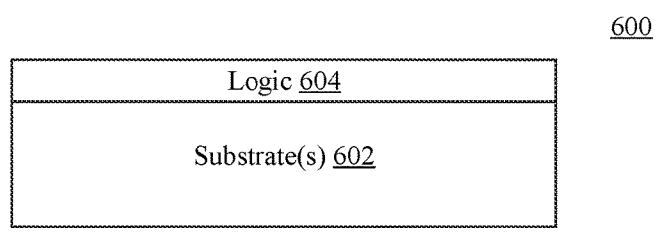
FIG. 6 is an illustration of an example of a semiconductor package apparatus according to an embodiment.

FIG. 6 shows a semiconductor package apparatus 600 (e.g., chip, die) that includes one or more substrates 602 (e.g., silicon, sapphire, gallium arsenide) and logic 604 (e.g., transistor array and other integrated circuit/IC components) coupled to the substrate(s) 602. The logic 604, which may be implemented in configurable logic and/or fixed-functionality logic hardware, may generally implement one or more aspects of the method 200 (FIGS. 2A, 2B, and 2C), the method 300 (FIG. 3), and/or the method 400 (FIG. 4), already discussed.

Figure 7:
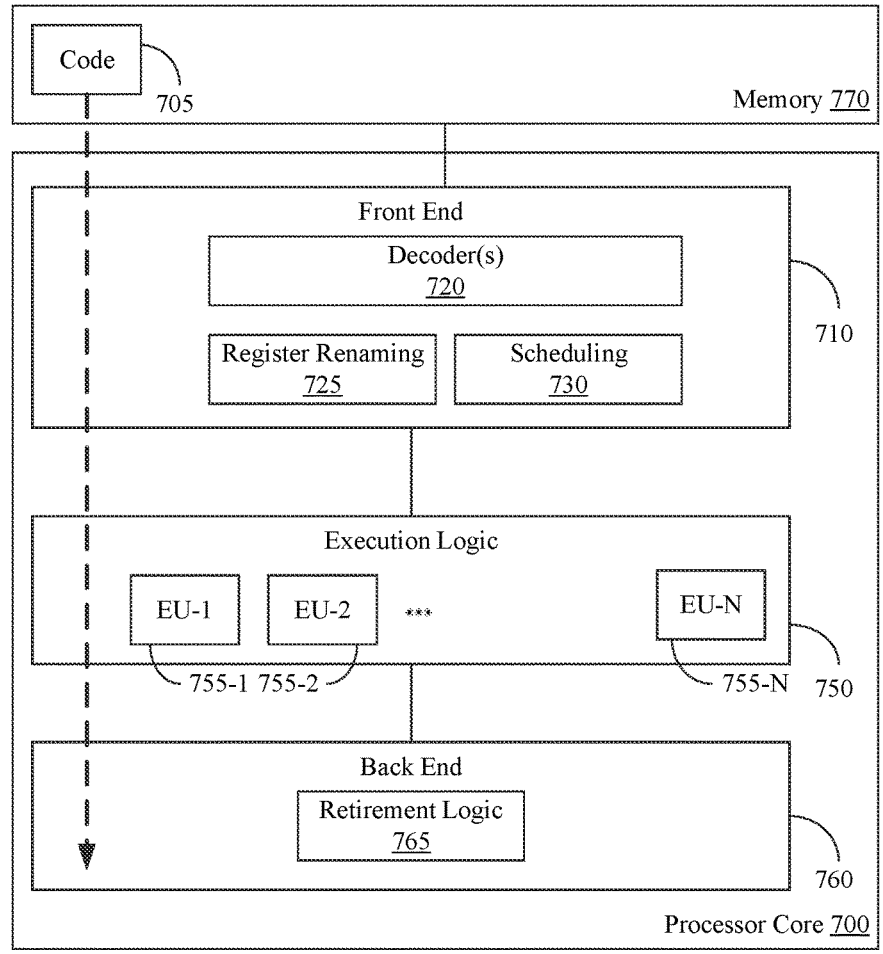
FIG. 7 is a block diagram of an exemplary processor according to an embodiment.

FIG. 7 illustrates a processor core 700 according to one embodiment. The processor core 700 may be the core for any type of processor, such as a micro-processor, an embedded processor, a digital signal processor (DSP), a network processor, or other device to execute code. Although only one processor core 700 is illustrated in FIG. 7, a processing element may alternatively include more than one of the processor core 700 illustrated in FIG. 7. The processor core 700 may be a single-threaded core or, for at least one embodiment, the processor core 700 may be multithreaded in that it may include more than one hardware thread context (or "logical processor") per core.

FIG. 7 also illustrates a memory 770 coupled to the processor core 700. The memory 770 may be any of a wide variety of memories (including various layers of memory hierarchy) as are known or otherwise available to those of skill in the art. The memory 770 may include one or more code 705 instruction(s) to be executed by the processor core 700, wherein the code 705 may implement the method 200 (FIGS. 2A, 2B, and 2C), the method 300 (FIG. 3), and/or the method 400 (FIG. 4), already discussed. The processor core 700 follows a program sequence of instructions indicated by the code 705. Each instruction may enter a front end portion 710 and be processed by one or more decoders 720. The decoder 720 may generate as its output a micro operation such as a fixed width micro operation in a predefined format, or may generate other instructions, microinstructions, or control signals which reflect the original code instruction. The illustrated front end portion 710 also includes register renaming logic 725 and scheduling logic 730, which generally allocate resources and queue the operation corresponding to the convert instruction for execution.

The processor core 700 is shown including execution logic 750 having a set of execution units 755-1 through 755-N. Some embodiments may include a number of execution units dedicated to specific functions or sets of functions. Other embodiments may include only one execution unit or one execution unit that can perform a particular function. The illustrated execution logic 750 performs the operations specified by code instructions.

After completion of execution of the operations specified by the code instructions, back end logic 760 retires the instructions of the code 705. In one embodiment, the processor core 700 allows out of order execution but requires in order retirement of instructions. Retirement logic 765 may take a variety of forms as known to those of skill in the art (e.g., re-order buffers or the like). In this manner, the processor core 700 is transformed during execution of the code 705, at least in terms of the output generated by the decoder, the hardware registers and tables utilized by the register renaming logic 725, and any registers (not shown) modified by the execution logic 750.

Although not illustrated in FIG. 7, a processing element may include other elements on chip with the processor core 700. For example, a processing element may include memory control logic along with the processor core 700. The processing element may include I/O control logic and/or may include I/O control logic integrated with memory control logic. The processing element may also include one or more caches.

Referring now to FIG. 8, shown is a block diagram of a computing system 800 in accordance with an embodiment. Shown in FIG. 8 is a multiprocessor system 800 that includes a first processing element 870 and a second processing element 880. While two processing elements 870 and 880 are shown, it is to be understood that an embodiment of the system 800 may also include only one such processing element.

The system 800 is illustrated as a point-to-point interconnect system, wherein the first processing element 870 and the second processing element 880 are coupled via a point-to-point interconnect 850. It should be understood that any or all of the interconnects illustrated in FIG. 8 may be implemented as a multi-drop bus rather than point-to-point interconnect.

As shown in FIG. 8, each of processing elements 870 and 880 may be multicore processors, including first and second processor cores (i.e., processor cores 874a and 874b and processor cores 884a and 884b). Such cores 874a, 874b, 884a, 884b may be configured to execute instruction code in a manner similar to that discussed above in connection with FIG. 7.

Each processing element 870, 880 may include at least one shared cache 896a, 896b. The shared cache 896a, 896b may store data (e.g., instructions) that are utilized by one or more components of the processor, such as the cores 874a, 874b and 884a, 884b, respectively. For example, the shared cache 896a, 896b may locally cache data stored in a memory 832, 834 for faster access by components of the processor. In one or more embodiments, the shared cache 896a, 896b may include one or more mid-level caches, such as level 2 (L2), level 3 (L3), level 4 (L4), or other levels of cache, a last level cache (LLC), and/or combinations thereof.

While shown with only two processing elements 870, 880, it is to be understood that the scope of the embodiments are not so limited. In other embodiments, one or more additional processing elements may be present in a given processor. Alternatively, one or more of processing elements 870, 880 may be an element other than a processor, such as an accelerator or a field programmable gate array. For example, additional processing element(s) may include additional processors(s) that are the same as a first processor 870, additional processor(s) that are heterogeneous or asymmetric to processor a first processor 870, accelerators (such as, e.g., graphics accelerators or digital signal processing (DSP) units), field programmable gate arrays, or any other processing element. There can be a variety of differences between the processing elements 870, 880 in terms of a spectrum of metrics of merit including architectural, micro architectural, thermal, power consumption characteristics, and the like. These differences may effectively manifest themselves as asymmetry and heterogeneity amongst the processing elements 870, 880. For at least one embodiment, the various processing elements 870, 880 may reside in the same die package.

The first processing element 870 may further include memory controller logic (MC) 872 and point-to-point (P-P) interfaces 876 and 878. Similarly, the second processing element 880 may include a MC 882 and P-P interfaces 886 and 888. As shown in FIG. 8, MC's 872 and 882 couple the processors to respective memories, namely a memory 832 and a memory 834, which may be portions of main memory locally attached to the respective processors. While the MC 872 and 882 is illustrated as integrated into the processing elements 870, 880, for alternative embodiments the MC logic may be discrete logic outside the processing elements 870, 880 rather than integrated therein.

The first processing element 870 and the second processing element 880 may be coupled to an I/O subsystem 890 via P-P interconnects 876 886, respectively. As shown in FIG. 8, the I/O subsystem 890 includes P-P interfaces 894 and 898. Furthermore, I/O subsystem 890 includes an interface 892 to couple I/O subsystem 890 with a high performance graphics engine 838. In one embodiment, bus 849 may be used to couple the graphics engine 838 to the I/O subsystem 890. Alternately, a point-to-point interconnect may couple these components.

In turn, I/O subsystem 890 may be coupled to a first bus 816 via an interface 896. In one embodiment, the first bus 816 may be a Peripheral Component Interconnect (PCI) bus, or a bus such as a PCI Express bus or another third generation I/O interconnect bus, although the scope of the embodiments are not so limited.

As shown in FIG. 8, various I/O devices 814 (e.g., biometric scanners, speakers, cameras, sensors) may be coupled to the first bus 816, along with a bus bridge 818 which may couple the first bus 816 to a second bus 820. In one embodiment, the second bus 820 may be a low pin count (LPC) bus. Various devices may be coupled to the second bus 820 including, for example, a keyboard/mouse 812, communication device(s) 826, and a data storage unit 819 such as a disk drive or other mass storage device which may include code 830, in one embodiment. The illustrated code 830 may implement the method 200 (FIGS. 2A, 2B, and 2C), the method 300 (FIG. 3), and/or the method 400 (FIG. 4), already discussed, and may be similar to the code 705 (FIG. 7), already discussed. Further, an audio I/O 824 may be coupled to second bus 820 and a battery 810 may supply power to the computing system 800.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

Additional Notes and Examples

Example 1 may include an audio gait detection system comprising network interface circuitry to receive audio input data from a plurality of microphone devices dispersed within a home, a processor coupled to the network interface circuitry, one or more memory devices coupled to the processor, the one or more memory devices including instructions, which when executed by the processor, cause the system to pre-process the audio input data to combine and strengthen an audio gait signal, detect a sound of one or more footsteps from the audio gait signal, and identify a person associated with the one or more footsteps using a set of trained footstep identification (ID) classifiers, wherein each trained footstep ID classifier is mapped to the gait of a specific person in the home based on a particular combination of personal profile, footwear, and floor surface within the home.

Example 2 may include the audio gait detection system of Example 1, wherein the instructions, when executed, further cause the computing system to segment the audio gait signal into an audio buffer to enable selection of segments that correspond to footsteps of sufficient loudness and quality.

Example 3 may include the audio gait detection system of Example 1, wherein the instructions to detect the sound of one or more footsteps from the audio gait signal further includes instructions, which when executed, cause the computing system to extract audio features from the audio gait signal representing footsteps, and perform an acoustic gait-based detection to determine whether actual footsteps are detected, wherein the acoustic gait-based detection includes machine learning.

Example 4 may include the audio gait detection system of Example 1, wherein the instructions to identify the person associated with the one or more footsteps using a set of trained footstep ID classifiers, which when executed, cause the computing system to compare the one or more footsteps with a current set of trained ID classifiers to obtain one or more of a score or a likelihood of success, if a match is not found, the sound of the particular combination of personal profile, footwear, and floor surface has not been heard before or has not been heard enough times to be recognized by the system, and the corresponding segmented audio from the audio buffer for the one or more footsteps is added to a training database as part of an automatic enrollment, wherein if the person's identity is known, the segmented audio is added to the training database with an ID and a confidence score, and wherein if the person's identity is unknown, the segmented audio is added to the training database without an ID or confidence score, and if a match is found, the particular combination of personal profile, footwear, and floor surface is already enrolled in the system, and the gait ID is output for application use.

Example 5 may include the audio gait detection system of Example 4, wherein when a predetermined number of automatic enrollments or a predetermined elapsed period of time has occurred, the instructions, when executed, further cause the computing system to perform clustering using a complete set of training samples, the complete set of training samples including the automatic enrollments and the current set of footstep ID classifiers, determine a person ID associated with each cluster, and build a classifier for each cluster, wherein the classifier is trained using machine learning, including one or more of a Deep Neural Network, a Maximum Likelihood Recognizer, a Support Vector Machine, a Convolutional Neural Network, a Recurrent Neural Network, or a Long Short-Term Memory network.

Example 6 may include the audio gait detection system of Example 4, wherein instructions to cause the computing system to output the gait ID for application use further includes instructions to cause the computing system to determine a location of the gait ID, store the gait ID and the location in a lookup table with a timestamp, when the system receives a message to be delivered to a specific person, search the lookup table to determine whether the specific person is home, if the specific person is home, determine the closest loudspeaker to the person using the person's location and known locations for each loudspeaker in the home, activate the closest loudspeaker to the person, and silence all other loudspeakers while sending the message through the closest loudspeaker.

Example 7 may include the audio gait detection system of Example 4, wherein instructions to cause the computing system to output the gait ID for application use further includes instructions to cause the computing system to output the gait ID and a proximity score to a usage predictor if the gait ID is near a device in the home, track user behavior history and generate summary tables with entries of user, day, time of day, and usage probability, wherein the usage predictor is to process the summary tables and provides a final score to a policy manager for each ambient compute and display device in the home, and wherein the policy manager to determine the state of each ambient compute and display device in the home based on the final score and device rules provided to the policy manager, wherein the state of a device includes one of turn on, turn off, deep sleep state, and wake from deep sleep state to save power or to reduce latency.

Example 8 may include an apparatus comprising a substrate, and logic coupled to the substrate, wherein the logic includes one or more of configurable logic or fixed-functionality hardware logic, the logic coupled to the substrate to pre-process audio input data from one or more microphones to combine and strengthen an audio gait signal, detect a sound of one or more footsteps from the audio gait signal, and identify a person associated with the one or more footsteps using a set of trained footstep identification (ID) classifiers, wherein each trained footstep ID classifier is mapped to the gait of a specific person in the home based on a particular combination of personal profile, footwear, and floor surface within the home.

Example 9 may include the apparatus of Example 8, wherein the logic coupled to the substrate to segment the audio gait signal into an audio buffer to enable selection of segments that correspond to footsteps of sufficient loudness and quality.

Example 10 may include the apparatus of Example 8, wherein the logic coupled to the substrate to detect the sound of one or more footsteps from the audio gait signal further includes logic coupled to the substrate to extract audio features from the audio gait signal representing footsteps, and perform an acoustic gait-based detection to determine whether actual footsteps are detected, wherein the acoustic gait-based detection includes machine learning.

Example 11 may include the apparatus of Example 8, wherein the logic coupled to the substrate to identify the person associated with the one or more footsteps using a set of trained footstep ID classifiers further includes logic coupled to the substrate to compare the one or more footsteps with a current set of trained ID classifiers to obtain one or more of a score or a likelihood of success, if a match is not found, the sound of the particular combination of personal profile, footwear, and floor surface has not been heard before or has not been heard enough times to be recognized by the system, and the corresponding segmented audio from the audio buffer for the one or more footsteps is added to a training database as part of an automatic enrollment, wherein if the person's identity is known, the segmented audio is added to the training database with an ID and a confidence score, and wherein if the person's identity is unknown, the segmented audio is added to the training database without an ID or confidence score, and if a match is found, the particular combination of personal profile, footwear, and floor surface is already enrolled in the system, and the gait ID is output for application use.

Example 12 may include the apparatus of Example 11, wherein when a predetermined number of automatic enrollments or a predetermined elapsed period of time has occurred, the logic coupled to the substrate to perform clustering using a complete set of training samples, the complete set of training samples including the automatic enrollments and the current set of footstep ID classifiers, determine a person ID associated with each cluster, and build a classifier for each cluster, wherein the classifier is trained using machine learning, including one or more of a Deep Neural Network, a Maximum Likelihood Recognizer, a Support Vector Machine, a Convolutional Neural Network, a Recurrent Neural Network, or a Long Short-Term Memory network.

Example 13 may include the apparatus of Example 11, wherein logic coupled to the substrate to output the gait ID for application use further includes logic coupled to the substrate to determine a location of the gait ID, store the gait ID and the location in a lookup table with a timestamp, when the system receives a message to be delivered to a specific person, search the lookup table to determine whether the specific person is home, if the specific person is home, determine the closest loudspeaker to the person using the person's location and known locations for each loudspeaker in the home, activate the closest loudspeaker to the person, and silence all other loudspeakers while sending the message through the closest loudspeaker.

Example 14 may include the apparatus of Example 11, wherein logic coupled to the substrate to output the gait ID for application use further includes logic coupled to the substrate to output the gait ID and a proximity score to a usage predictor if the gait ID is near a device in the home, track user behavior history and generate summary tables with entries of user, day, time of day, and usage probability, wherein the usage predictor is to process the summary tables and provides a final score to a policy manager for each ambient compute and display device in the home, and wherein the policy manager to determine the state of each ambient compute and display device in the home based on the final score and device rules provided to the policy manager, wherein the state of a device includes one of turn on, turn off, deep sleep state, and wake from deep sleep state to save power or to reduce latency.

Example 15 may include a method of performing audio gait detection and identification comprising pre-processing audio input data from one or more microphones to combine and strengthen an audio gait signal, detecting a sound of one or more footsteps from the audio gait signal, and identifying the person associated with the one or more footsteps using a set of trained footstep identification (ID) classifiers, wherein each trained footstep ID classifier is mapped to the gait of a specific person in the home based on a particular combination of personal profile, footwear, and floor surface within the home.

Example 16 may include the method of Example 15, further comprising segmenting the audio gait signal into an audio buffer to enable selection of segments that correspond to footsteps of sufficient loudness and quality.

Example 17 may include the method of Example 15, wherein detecting the sound of one or more footsteps from the audio gait signal further comprises extracting audio features from the audio gait signal representing footsteps, and performing an acoustic gait-based detection to determine whether actual footsteps are detected, wherein the acoustic gait-based detection includes machine learning.

Example 18 may include the method of Example 15, wherein identifying the person associated with the one or more footsteps using a set of trained footstep ID classifiers further comprises comparing the one or more footsteps with a current set of trained ID classifiers to obtain one or more of a score or a likelihood of success, if a match is not found, adding the corresponding segmented audio from the audio buffer for the one or more footsteps to a training database as part of an automatic enrollment, wherein if the person's identity is known, the segmented audio is added to the training database with an ID and a confidence score, and wherein if the person's identity is unknown, the segmented audio is added to the training database without an ID or confidence score, and if a match is found, outputting the gait ID for application use.

Example 19 may include the method of Example 18, wherein when a predetermined number of automatic enrollments or a predetermined elapsed period of time has occurred, the method further comprising performing clustering using a complete set of training samples, the complete set of training samples including the automatic enrollments and the current set of footstep ID classifiers, determining a person ID associated with each cluster, and building a classifier for each cluster, wherein the classifier is trained using machine learning, including one or more of a Deep Neural Network, a Maximum Likelihood Recognizer, a Support Vector Machine, a Convolutional Neural Network, a Recurrent Neural Network, or a Long Short-Term Memory network.

Example 20 may include the method of Example 18, wherein outputting the gait ID for application use further comprises determining a location of the gait ID, storing the gait ID and the location in a lookup table with a timestamp, when the system receives a message to be delivered to a specific person, searching the lookup table to determine whether the specific person is home, if the specific person is home, determining the closest loudspeaker to the person using the person's location and known locations for each loudspeaker in the home, activating the closest loudspeaker to the person, and silencing all other loudspeakers while sending the message through the closest loudspeaker.

Example 21 may include the method of Example 18, wherein outputting the gait ID for application use further comprises outputting the gait ID and a proximity score to a usage predictor if the gait ID is near a device in the home, tracking user behavior history and generate summary tables with entries of user, day, time of day, and usage probability, wherein the usage predictor processes the summary tables and provides a final score to a policy manager for each ambient compute and display device in the home, and wherein the policy manager to determine the state of each ambient compute and display device in the home based on the final score and device rules provided to the policy manager, wherein the state of a device includes one of turn on, turn off, deep sleep state, and wake from deep sleep state to save power or to reduce latency.

Example 22 may include at least one computer readable medium, comprising a set of instructions, which when executed by a computing device, cause the computing device to pre-process audio input data from one or more microphones to combine and strengthen an audio gait signal, detect a sound of one or more footsteps from the audio gait signal, and identify a person associated with the one or more footsteps using a set of trained footstep identification (ID) classifiers, wherein each trained footstep ID classifier is mapped to the gait of a specific person in the home based on a particular combination of personal profile, footwear, and floor surface within the home.

Example 23 may include the at least one computer readable medium of Example 22, comprising further instructions, which when executed by the computing device, cause the computing device to segment the audio gait signal into an audio buffer to enable selection of segments that correspond to footsteps of sufficient loudness and quality.

Example 24 may include the at least one computer readable medium of Example 22, wherein instructions to detect the sound of one or more footsteps from the audio gait signal further includes a set of instructions, which when executed by the computing device, cause the computing device to extract audio features from the audio gait signal representing footsteps, and perform an acoustic gait-based detection to determine whether actual footsteps are detected, wherein the acoustic gait-based detection includes machine learning.

Example 25 may include the at least one computer readable medium of Example 22, wherein instructions to identify the person associated with the one or more footsteps using a set of trained footstep ID classifiers further includes a set of instructions, which when executed by the computing device, cause the computing device to compare the one or more footsteps with a current set of trained ID classifiers to obtain one or more of a score or a likelihood of success, if a match is not found, the sound of the particular combination of personal profile, footwear, and floor surface has not been heard before or has not been heard enough times to be recognized by the system, and the corresponding segmented audio from the audio buffer for the one or more footsteps is added to a training database as part of an automatic enrollment, wherein if the person's identity is known, the segmented audio is added to the training database with an ID and a confidence score, and wherein if the person's identity is unknown, the segmented audio is added to the training database without an ID or confidence score, and if a match is found, the particular combination of personal profile, footwear, and floor surface is already enrolled in the system, and the gait ID is output for application use.

Example 26 may include the at least one computer readable medium of Example 25, wherein when a predetermined number of automatic enrollments or a predetermined elapsed period of time has occurred, a further set of instructions, which when executed by the computing device, further cause the computing device to perform clustering using a complete set of training samples, the complete set of training samples including the automatic enrollments and the current set of footstep ID classifiers, determine a person ID associated with each cluster, and build a classifier for each cluster, wherein the classifier is trained using machine learning, including one or more of a Deep Neural Network, a Maximum Likelihood Recognizer, a Support Vector Machine, a Convolutional Neural Network, a Recurrent Neural Network, or a Long Short-Term Memory network.

Example 27 may include the at least one computer readable medium of Example 25, wherein instructions to output the gait ID for application use further includes a set of instructions, which when executed by a computing device, cause the computing device to determine a location of the gait ID, store the gait ID and the location in a lookup table with a timestamp, when the system receives a message to be delivered to a specific person, search the lookup table to determine whether the specific person is home, if the specific person is home, determine the closest loudspeaker to the person using the person's location and known locations for each loudspeaker in the home, activate the closest loudspeaker to the person, and silence all other loudspeakers while sending the message through the closest loudspeaker.

Example 28 may include the at least one computer readable medium of Example 25, wherein instructions to output the gait ID for application use further includes a set of instructions, which when executed by the computing device, cause the computing device to output the gait ID and a proximity score to a usage predictor if the gait ID is near a device in the home, track user behavior history and generate summary tables with entries of user, day, time of day, and usage probability, wherein the usage predictor is to process the summary tables and provides a final score to a policy manager for each ambient compute and display device in the home, and wherein the policy manager to determine the state of each ambient compute and display device in the home based on the final score and device rules provided to the policy manager, wherein the state of a device includes one of turn on, turn off, deep sleep state, and wake from deep sleep state to save power or to reduce latency.

Example 29 may include a gait detection and identification system, comprising a pre-processing pipeline to process audio input data from a plurality of microphones dispersed throughout a home, the pre-processing pipeline to combine and strengthen an audio gait signal from the audio input data, a gait detector coupled to the pre-processing pipeline to detect sounds of one or more footsteps from the audio gait signal, and a person identifier/verifier to identify a person associated with the one or more footsteps using a set of trained footstep identification (ID) classifiers, wherein each trained footstep ID classifier is mapped to the gait of a specific person in the home based on a particular combination of personal profile, footwear, and floor surface within the home.

Example 30 may include the system of Example 29, further comprising an audio buffer to store the audio gait signals, wherein the audio gait signals are segmented in the audio buffer to enable selection of segments that correspond to footsteps of sufficient loudness and quality.

Example 31 may include the system of Example 29, wherein the gait detector to extract audio features representing footsteps from the audio gait signal and to perform an acoustic gait-based detection to determine whether actual footsteps are detected, wherein the acoustic gait-based detection includes machine learning.

Example 32 may include the system of Example 31, wherein the machine learning algorithms includes at least one of one or more of a Deep Neural Network, a Maximum Likelihood Recognizer, a Support Vector Machine, a Convolutional Neural Network, a Recurrent Neural Network, or a Long Short-Term Memory network.

Example 33 may include the system of Example 29, wherein the person identifier/verifier, coupled to the gait detector, to identify the person associated with the one or more footsteps by comparing the one or more footsteps with a current set of trained footstep ID classifiers to obtain one or more of a score or a likelihood of success and if there is a match with one of the trained footstep ID classifiers, the system to output a gait ID.

Example 34 may include the system of Example 33, wherein if there is no match to any of the trained footstep ID classifiers, the segmented audio from the audio buffer corresponding to the one or more footsteps is added to a training database as a new enrollment, wherein if the person's identity is known, the segmented audio is added to the training database with an ID and a confidence score, and wherein if the person's identity is unknown, the segmented audio is added to the training database without an ID or confidence score.

Example 35 may include the system of Example 33, wherein if there is no match to any of the trained footstep ID classifiers, the segmented audio from the audio buffer corresponding to the one or more footsteps is added to a training database as a new enrollment, wherein if the person's identity is unknown, the person's ID is obtained using a voice dialogue or face ID and the segmented audio is added to the training database with the ID and a confidence score.

Example 36 may include the system of Example 34, wherein the trained footstep ID classifiers are updated when a predetermined number of automatic enrollments or a predetermined elapsed period of time has occurred, wherein the trained footstep ID classifiers are updated using clustering and machine learning algorithms, wherein with each update, a complete set of training samples are clustered, the complete set of training samples including all new enrollments and the current set of footstep ID classifiers.

Example 37 may include the system of Example 36, wherein a person ID is associated with each cluster and a classifier is built for each cluster, wherein each cluster is trained using machine learning.

Example 38 may include the system of Example 37, wherein the machine learning algorithms include one or more of a Deep Neural Network, a Maximum Likelihood Recognizer, a Support Vector Machine, a Convolutional Neural Network, a Recurrent Neural Network, or a Long Short-Term Memory Network.

Example 39 may include at least one computer readable medium comprising a set of instructions, which when executed by a computing system, cause the computing system to perform the method of any one of Examples 15 to 21.

Example 40 may include an apparatus comprising means for performing the method of any one of Examples 15 to 21.

Example 41 may include an apparatus for audio gait detection and identification comprising means for pre-processing audio input data from one or more microphones to combine and strengthen an audio gait signal, means for detecting a sound of one or more footsteps from the audio gait signal, and means for identifying the person associated with the one or more footsteps using a set of trained footstep identification (ID) classifiers, wherein each trained footstep ID classifier is mapped to the gait of a specific person in the home based on a particular combination of personal profile, footwear, and floor surface within the home.

Example 42 may include the apparatus of Example 41, further comprising means for segmenting the audio gait signal into an audio buffer to enable selection of segments that correspond to footsteps of sufficient loudness and quality.

Example 43 may include the apparatus of Example 41, wherein means for detecting the sound of one or more footsteps from the audio gait signal further comprises means for extracting audio features from the audio gait signal representing footsteps, and means for performing an acoustic gait-based detection to determine whether actual footsteps are detected, wherein the acoustic gait-based detection includes machine learning.

Example 44 may include the apparatus of Example 41, wherein means for identifying the person associated with the one or more footsteps using a set of trained footstep ID classifiers further comprises means for comparing the one or more footsteps with a current set of trained ID classifiers to obtain one or more of a score or a likelihood of success, if a match is not found, means for adding the corresponding segmented audio from the audio buffer for the one or more footsteps to a training database as part of an automatic enrollment, wherein if the person's identity is known, the segmented audio is added to the training database with an ID and a confidence score, and wherein if the person's identity is unknown, the segmented audio is added to the training database without an ID or confidence score, and if a match is found, means for outputting the gait ID for application use.

Example 45 may include the apparatus of Example 44, wherein when a predetermined number of automatic enrollments or a predetermined elapsed period of time has occurred, the method further comprising means for performing clustering using a complete set of training samples, the complete set of training samples including the automatic enrollments and the current set of footstep ID classifiers, means for determining a person ID associated with each cluster, and means for building a classifier for each cluster, wherein the classifier is trained using machine learning, including one or more of a Deep Neural Network, a Maximum Likelihood Recognizer, a Support Vector Machine, a Convolutional Neural Network, a Recurrent Neural Network, or a Long Short-Term Memory network.

Example 46 may include the apparatus of Example 44, wherein means for outputting the gait ID for application use further comprises means for determining a location of the gait ID, means for storing the gait ID and the location in a lookup table with a timestamp, when the system receives a message to be delivered to a specific person, means for searching the lookup table to determine whether the specific person is home, if the specific person is home, means for determining the closest loudspeaker to the person using the person's location and known locations for each loudspeaker in the home, means for activating the closest loudspeaker to the person, and means for silencing all other loudspeakers while sending the message through the closest loudspeaker.

Example 47 may include the apparatus of Example 44, wherein means for outputting the gait ID for application use further comprises means for outputting the gait ID and a proximity score to a usage predictor if the gait ID is near a device in the home, means for tracking user behavior history and generate summary tables with entries of user, day, time of day, and usage probability, wherein the usage predictor is to process the summary tables and provides a final score to a policy manager for each ambient compute and display device in the home, and wherein the policy manager to determine the state of each ambient compute and display device in the home based on the final score and device rules provided to the policy manager, wherein the state of a device includes one of turn on, turn off, deep sleep state, and wake from deep sleep state to save power or to reduce latency.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An audio gait detection system comprising:
   network interface circuitry to receive audio input data from a plurality of microphone devices dispersed within a home;
   a processor coupled to the network interface circuitry;
   one or more memory devices coupled to the processor, the one or more memory devices including instructions, which when executed by the processor, cause the system to:
   pre-process the audio input data to combine and strengthen an audio gait signal;
   detect a sound of one or more footsteps from the audio gait signal; and
   identify a person associated with the one or more footsteps using a set of trained footstep identification (ID) classifiers, wherein each trained footstep ID classifier is to be mapped to the gait of the person in the home based on a particular combination of personal profile, footwear, and floor surface within the home.

2. The audio gait detection system of claim 1, wherein the instructions, when executed, further cause the computing system to segment the audio gait signal into an audio buffer to enable selection of segments that correspond to footsteps of sufficient loudness and quality.

3. The audio gait detection system of claim 1, wherein the instructions to detect the sound of one or more footsteps from the audio gait signal further includes instructions, which when executed, cause the computing system to:
   extract audio features from the audio gait signal representing footsteps; and
   perform an acoustic gait-based detection to determine whether actual footsteps are detected, wherein the acoustic gait-based detection includes machine learning.

4. The audio gait detection system of claim 1, wherein the instructions to identify the person associated with the one or more footsteps using a set of trained footstep ID classifiers, which when executed, cause the computing system to:
- compare the one or more footsteps with a current set of trained ID classifiers to obtain one or more of a score or a likelihood of success;
- if a match is not found, the sound of the particular combination of personal profile, footwear, and floor surface has not been heard before or has not been heard enough times to be recognized by the system, and the corresponding segmented audio from the audio buffer for the one or more footsteps is added to a training database as part of an automatic enrollment, wherein if the person's identity is known, the segmented audio is added to the training database with an ID and a confidence score, and wherein if the person's identity is unknown, the segmented audio is added to the training database without an ID or confidence score; and
- if a match is found, the particular combination of personal profile, footwear, and floor surface is already enrolled in the system, and the gait ID is output for application use.

5. The audio gait detection system of claim 4, wherein when a predetermined number of automatic enrollments or a predetermined elapsed period of time has occurred, the instructions, when executed, further cause the computing system to:
- perform clustering using a complete set of training samples, the complete set of training samples including the automatic enrollments and the current set of footstep ID classifiers;
- determine a person ID associated with each cluster; and
- build a classifier for each cluster, wherein the classifier is trained using machine learning, including one or more of a Deep Neural Network, a Maximum Likelihood Recognizer, a Support Vector Machine, a Convolutional Neural Network, a Recurrent Neural Network, or a Long Short-Term Memory network.

6. The audio gait detection system of claim 4, wherein instructions to cause the computing system to output the gait ID for application use further includes instructions to cause the computing system to:
- determine a location of the gait ID;
- store the gait ID and the location in a lookup table with a timestamp;
- when the system receives a message to be delivered to the person,
  - search the lookup table to determine whether the specific person is home;
  - if the specific person is home, determine the closest loudspeaker to the person using the person's location and known locations for each loudspeaker in the home;
  - activate the closest loudspeaker to the person; and
  - silence all other loudspeakers while sending the message through the closest loudspeaker.

7. The audio gait detection system of claim 4, wherein instructions to cause the computing system to output the gait ID for application use further includes instructions to cause the computing system to:
- output the gait ID and a proximity score to a usage predictor if the gait ID is near a device in the home;
- track user behavior history and generate summary tables with entries of user, day, time of day, and usage probability, wherein the usage predictor is to process the summary tables and provides a final score to a policy manager for each ambient compute and display device in the home; and
- wherein the policy manager to determine the state of each ambient compute and display device in the home based on the final score and device rules provided to the policy manager, wherein the state of a device includes one of turn on, turn off, deep sleep state, and wake from deep sleep state to save power or to reduce latency.

8. An apparatus comprising:
- a substrate; and
- logic coupled to the substrate, wherein the logic includes one or more of configurable logic or fixed-functionality hardware logic, the logic coupled to the substrate to:
- pre-process audio input data from one or more microphones to combine and strengthen an audio gait signal;
- detect a sound of one or more footsteps from the audio gait signal; and
- identify a person associated with the one or more footsteps using a set of trained footstep identification (ID) classifiers, wherein each trained footstep ID classifier is to be mapped to the gait of the person in the home based on a particular combination of personal profile, footwear, and floor surface within the home.

9. The apparatus of claim 8, wherein the logic coupled to the substrate to segment the audio gait signal into an audio buffer to enable selection of segments that correspond to footsteps of sufficient loudness and quality.

10. The apparatus of claim 8, wherein the logic coupled to the substrate to detect the sound of one or more footsteps from the audio gait signal further includes logic coupled to the substrate to:
- extract audio features from the audio gait signal representing footsteps; and
- perform an acoustic gait-based detection to determine whether actual footsteps are detected, wherein the acoustic gait-based detection includes machine learning.

11. The apparatus of claim 8, wherein the logic coupled to the substrate to identify the person associated with the one or more footsteps using a set of trained footstep ID classifiers further includes logic coupled to the substrate to:
- compare the one or more footsteps with a current set of trained ID classifiers to obtain one or more of a score or a likelihood of success;
- if a match is not found, the sound of the particular combination of personal profile, footwear, and floor surface has not been heard before or has not been heard enough times to be recognized by the system, and the corresponding segmented audio from the audio buffer for the one or more footsteps is added to a training database as part of an automatic enrollment, wherein if the person's identity is known, the segmented audio is added to the training database with an ID and a confidence score, and wherein if the person's identity is unknown, the segmented audio is added to the training database without an ID or confidence score; and
- if a match is found, the particular combination of personal profile, footwear, and floor surface is already enrolled in the system, and the gait ID is output for application use.

12. The apparatus of claim 11, wherein when a predetermined number of automatic enrollments or a predetermined elapsed period of time has occurred, the logic coupled to the substrate to:

perform clustering using a complete set of training samples, the complete set of training samples including the automatic enrollments and the current set of footstep ID classifiers;
determine a person ID associated with each cluster; and
build a classifier for each cluster, wherein the classifier is trained using machine learning, including one or more of a Deep Neural Network, a Maximum Likelihood Recognizer, a Support Vector Machine, a Convolutional Neural Network, a Recurrent Neural Network, or a Long Short-Term Memory network.

13. The apparatus of claim 11, wherein logic coupled to the substrate to output the gait ID for application use further includes logic coupled to the substrate to:
determine a location of the gait ID;
store the gait ID and the location in a lookup table with a timestamp;
when the system receives a message to be delivered to the person,
   search the lookup table to determine whether the specific person is home;
   if the specific person is home, determine the closest loudspeaker to the person using the person's location and known locations for each loudspeaker in the home;
   activate the closest loudspeaker to the person; and
   silence all other loudspeakers while sending the message through the closest loudspeaker.

14. A method comprising:
pre-processing audio input data from one or more microphones to combine and strengthen an audio gait signal;
detecting a sound of one or more footsteps from the audio gait signal; and
identifying the person associated with the one or more footsteps using a set of trained footstep identification (ID) classifiers, wherein each trained footstep ID classifier is mapped to the gait of the person in the home based on a particular combination of personal profile, footwear, and floor surface within the home.

15. The method of claim 14, further comprising segmenting the audio gait signal into an audio buffer to enable selection of segments that correspond to footsteps of sufficient loudness and quality.

16. The method of claim 14, wherein detecting the sound of one or more footsteps from the audio gait signal further comprises:
extracting audio features from the audio gait signal representing footsteps; and
performing an acoustic gait-based detection to determine whether actual footsteps are detected, wherein the acoustic gait-based detection includes machine learning.

17. The method of claim 14, wherein identifying the person associated with the one or more footsteps using a set of trained footstep ID classifiers further comprises:
comparing the one or more footsteps with a current set of trained ID classifiers to obtain one or more of a score or a likelihood of success;
if a match is not found, adding the corresponding segmented audio from the audio buffer for the one or more footsteps to a training database as part of an automatic enrollment, wherein if the person's identity is known, the segmented audio is added to the training database with an ID and a confidence score, and wherein if the person's identity is unknown, the segmented audio is added to the training database without an ID or confidence score; and
if a match is found, outputting the gait ID for application use.

18. The method of claim 17, wherein when a predetermined number of automatic enrollments or a predetermined elapsed period of time has occurred, the method further comprising:
performing clustering using a complete set of training samples, the complete set of training samples including the automatic enrollments and the current set of footstep ID classifiers;
determining a person ID associated with each cluster; and
building a classifier for each cluster, wherein the classifier is trained using machine learning, including one or more of a Deep Neural Network, a Maximum Likelihood Recognizer, a Support Vector Machine, a Convolutional Neural Network, a Recurrent Neural Network, or a Long Short-Term Memory network.

19. The method of claim 17, wherein outputting the gait ID for application use further comprises:
determining a location of the gait ID;
storing the gait ID and the location in a lookup table with a timestamp;
when the system receives a message to be delivered to the person,
   searching the lookup table to determine whether the specific person is home;
   if the specific person is home, determining the closest loudspeaker to the person using the person's location and known locations for each loudspeaker in the home;
   activating the closest loudspeaker to the person; and
   silencing all other loudspeakers while sending the message through the closest loudspeaker.

20. At least one non-transitory computer readable medium, comprising a set of instructions, which when executed by a computing device, cause the computing device to:
pre-process audio input data from one or more microphones to combine and strengthen an audio gait signal;
detect a sound of one or more footsteps from the audio gait signal; and
identify a person associated with the one or more footsteps using a set of trained footstep identification (ID) classifiers, wherein each trained footstep ID classifier is to be mapped to the gait of the person in the home based on a particular combination of personal profile, footwear, and floor surface within the home.

21. The at least one non-transitory computer readable medium of claim 20, comprising further instructions, which when executed by the computing device, cause the computing device to segment the audio gait signal into an audio buffer to enable selection of segments that correspond to footsteps of sufficient loudness and quality.

22. The at least one non-transitory computer readable medium of claim 20, wherein instructions to detect the sound of one or more footsteps from the audio gait signal further includes a set of instructions, which when executed by the computing device, cause the computing device to:
extract audio features from the audio gait signal representing footsteps; and
perform an acoustic gait-based detection to determine whether actual footsteps are detected, wherein the acoustic gait-based detection includes machine learning.

23. The at least one non-transitory computer readable medium of claim 20, wherein instructions to identify the person associated with the one or more footsteps using a set of trained footstep ID classifiers further includes a set of instructions, which when executed by the computing device, cause the computing device to:

compare the one or more footsteps with a current set of trained ID classifiers to obtain one or more of a score or a likelihood of success;

if a match is not found, the sound of the particular combination of personal profile, footwear, and floor surface has not been heard before or has not been heard enough times to be recognized by the system, and the corresponding segmented audio from the audio buffer for the one or more footsteps is added to a training database as part of an automatic enrollment, wherein if the person's identity is known, the segmented audio is added to the training database with an ID and a confidence score, and wherein if the person's identity is unknown, the segmented audio is added to the training database without an ID or confidence score; and if a match is found, the particular combination of personal profile, footwear, and floor surface is already enrolled in the system, and the gait ID is output for application use.

24. The at least one non-transitory computer readable medium of claim 23, wherein when a predetermined number of automatic enrollments or a predetermined elapsed period of time has occurred, a further set of instructions, which when executed by the computing device, further cause the computing device to:

perform clustering using a complete set of training samples, the complete set of training samples including the automatic enrollments and the current set of footstep ID classifiers;

determine a person ID associated with each cluster; and build a classifier for each cluster, wherein the classifier is trained using machine learning, including one or more of a Deep Neural Network, a Maximum Likelihood Recognizer, a Support Vector Machine, a Convolutional Neural Network, a Recurrent Neural Network, or a Long Short-Term Memory network.

25. The at least one non-transitory computer readable medium of claim 23, wherein instructions to output the gait ID for application use further includes a set of instructions, which when executed by a computing device, cause the computing device to:

determine a location of the gait ID;

store the gait ID and the location in a lookup table with a timestamp;

when the system receives a message to be delivered to the person,
search the lookup table to determine whether the specific person is home;
if the specific person is home, determine the closest loudspeaker to the person using the person's location and known locations for each loudspeaker in the home;
activate the closest loudspeaker to the person; and
silence all other loudspeakers while sending the message through the closest loudspeaker.

* * * * *